J. E. THROPP.
FABRIC LAYING ATTACHMENT FOR TIRE MAKING MACHINES.
APPLICATION FILED AUG. 9, 1917.
1,321,493. Patented Nov. 11, 1919
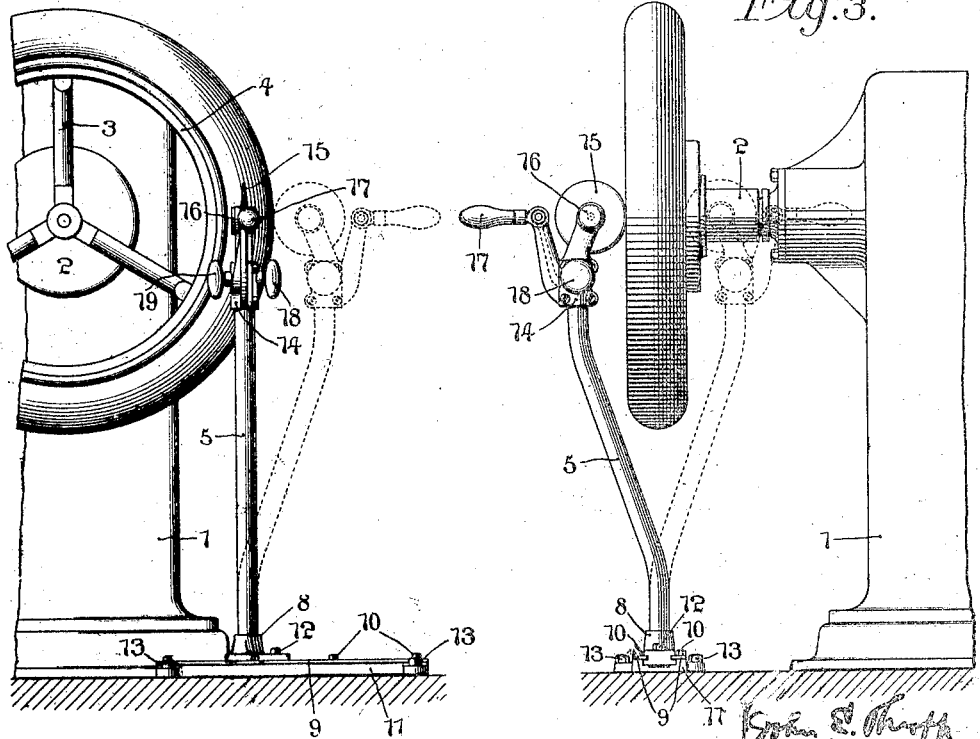

UNITED STATES PATENT OFFICE.

JOHN E. THROPP, OF TRENTON, NEW JERSEY, ASSIGNOR TO THE DE LASKI AND THROPP CIRCULAR WOVEN TIRE COMPANY, OF TRENTON, NEW JERSEY, A CORPORATION OF NEW JERSEY.

FABRIC-LAYING ATTACHMENT FOR TIRE-MAKING MACHINES.

1,321,493.    Specification of Letters Patent.    Patented Nov. 11, 1919.

Application filed August 9, 1917. Serial No. 185,381.

*To all whom it may concern:*

Be it known that I, JOHN E. THROPP, a citizen of the United States, and resident of Trenton, in the county of Mercer and State of New Jersey, have invented a new and useful Improvement in Fabric-Laying Attachments for Tire-Making Machines, of which the following is a specification.

This invention relates to an improvement in fabric laying attachments for tire making machines, with the object in view of providing a device of this character which is exceedingly simple in construction and easy to operate.

Another object is to provide such a device which may be used in connection with any kind of a tire making machine having a rotating core.

A further object consists in providing such a device which is adapted for laying down the plies of fabric on every part of the exterior surface of the core, and for laying down the plies of fabric both under and over the bead core.

A still further object consists in providing certain improvements in the form, construction and arrangement of the parts whereby the above-mentioned and other advantages may be effectively attained.

A practical embodiment of my invention is represented in the accompanying drawings, in which—

Figure 1 represents a detail top plan view, partly broken away, showing the device in conjunction with part of a tire making machine, Fig. 2 represents a side elevation of the parts shown in Fig. 1.

Fig. 3 represents an elevation taken at right angles to Fig. 2.

Fig. 4 represents an enlarged detail section through the ball and socket mounting for the supporting arm, and Fig. 5 represents a similar view taken at right angles to Fig. 4.

The reference numeral 1 denotes the casing of a tire making machine, such, for instance, as that disclosed in United States Letters Patent to John E. Thropp, Peter D. Thropp and Albert de Laski, No. 1,119,326, dated December 1, 1914, and entitled "Machine for making or building up pneumatic tires."

A spindle 2 protrudes from the casing 1 and carries a spider 3 for mounting a core 4, all as set forth in the said patent. It will be understood that suitable means (not shown) is provided for rotating the core 4, at desired speeds, and that suitable means is also provided for applying the tire fabric to the periphery of the core 4 and for placing the beads of the tire in position.

The fabric laying attachment which forms the subject matter of this invention comprises a supporting arm 5, the lower end of which carries a ball 6 which is fitted to rest in a concave block 7 and be embraced by a sleeve 8, which latter also surrounds the block 7. The sleeve 8 is provided with lateral grooves for the reception of gibs 9 that are secured by cap screws 10 to a floor plate or guide 11. By this arrangement, the sleeve 8 and the block 7, and hence the ball 6 of the arm 5, are adapted for sliding adjustment in the plate or guide 11. A set screw 12 may be operated to secure the parts in any desired position throughout the length of the guide 11.

It is intended that the floor plate or guide 11 shall be secured to the floor or other foundation upon which the tire making machine rests, so as to lie in the plane of the core 4, as clearly shown in Figs. 1 and 3, and to this end lag screws 13, or other suitable attaching devices, may be utilized.

The arm 5 is preferably composed of a metallic tube, and its upper end is embraced by a head piece 14 which is bifurcated for the reception of a suitable fabric laying tool, such as a forming roll 15, which latter is preferably mounted in a ball bearing, as indicated at 16.

A rearwardly projecting handle 17 and laterally projecting knobs or handles 18, 19, are fitted to the head piece 14.

It will be observed that the arm 5 is bent so that, even though its lower end is mounted in the central plane of the core 4 and its upper end projects sufficiently high so that the forming roll 15 is substantially on a level with the axis of the core constituted by the spindle 2, nevertheless, the device may be manipulated so as to bring the operating edge of the forming roll into engagement with all parts of the exterior surface of the core without any danger of the arm impinging against the core or fabric thereon.

In operation, after one or more strips of fabric have been suitably stretched upon the periphery of the core 4, in a well known and suitable manner, the operator may seize the fabric forming device by the handle 17 and either knob 18 or 19, and force the forming roll 15 into engagement with the fabric, during the rotation of the core. As will be well understood by a workman skilled in this industry, the roll will first be applied to that part of the fabric which is adjacent the tread, and gradually worked inward, radially across the surface of the core, until it reaches the innermost part. As the core is rotating during this operation, the effect of the tool will be to lay the side of the fabric upon which it is operating smoothly against the core and in conformity therewith. After this has been accomplished upon one side of the core, the operation may be repeated upon the opposite side, and this may be continued until the tire is complete.

It will be noted that the arrangement which I have provided enables the angle at which the forming roll 15 engages the core, or fabric thereon, to be varied at will, so that it may be kept at all times at the most desirable angle to the work, which I believe to be substantially a right angle, and so that it may also be caused to operate upon all surfaces of the beads of the tire in order to lay the outer layers of fabric firmly over and in contact with the beads.

The adjustment in the plate or guide 11 enables the arm 5 to be suitably secured for operation upon cores of various diameters, and I have provided two knobs 18 and 19 so that the device will be equally convenient to a right handed or a left handed operator.

It will be understood that various changes may be resorted to in the form, construction and arrangement of the several parts without departing from the spirit and scope of my invention; and hence I do not intend to be limited to the details herein shown and described except as they may be specifically included in the claims.

What I claim is:—

1. A fabric laying attachment for a tire making machine having a rotary core comprising an upright movable arm, a fabric laying tool carried thereby, supporting means for one end of said arm, the said end of the arm being connected to the supporting means by a universal joint, and means for grasping the arm to bring the tool into engagement with the core.

2. A fabric laying attachment for a tire making machine having a rotary core comprising an upright movable arm, a fabric laying tool carried thereby, adjustable supporting means for one end of said arm, the said end of the arm being connected to the supporting means by a universal joint, and means for grasping the arm to bring the tool into engagement with the core.

3. A fabric laying attachment for a tire making machine having a rotary core comprising an upright movable arm, a fabric laying tool carried thereby, a support for one end of the arm in the central plane of the core, the arm being connected to the support by a universal joint, and means for grasping the arm to bring the tool into engagement with the core.

4. A fabric laying attachment for a tire making machine having a rotary core comprising an upright movable arm, a fabric laying tool carried thereby, a support for one end of the arm in the central plane of the core, the arm being connected to the support by a universal joint, said support being adjustable in the plane of the core, and means for grasping the arm to bring the tool into engagement with the core.

5. A fabric laying attachment for a tire making machine having a rotary core comprising an upright movable arm, a fabric laying tool carried thereby, a support for one end of the arm below the core and in the central plane thereof, the arm being connected to the support by a universal joint, the said arm being of such length as to support the tool substantially at the height of the axis of rotation of the core, and means for grasping the arm to bring the tool into engagement with the core.

6. A fabric laying attachment for a tire making machine having a rotary core comprising an upright movable arm, a fabric laying tool carried thereby, a support for one end of the arm below the core and in the central plane thereof, the arm being connected to the support by a universal joint, the said arm being of such length as to support the tool substantially at the height of the axis of rotation of the core, said support being adjustable in the plane of the core, and means for grasping the arm to bring the tool into engagement with the core.

In testimony that I claim the foregoing as my invention I have signed my name this 31st day of July, 1917.

JOHN E. THROPP.